Dec. 31, 1957  J. C. COOLEY  2,818,187
MINE TRUCK
Filed April 26, 1956
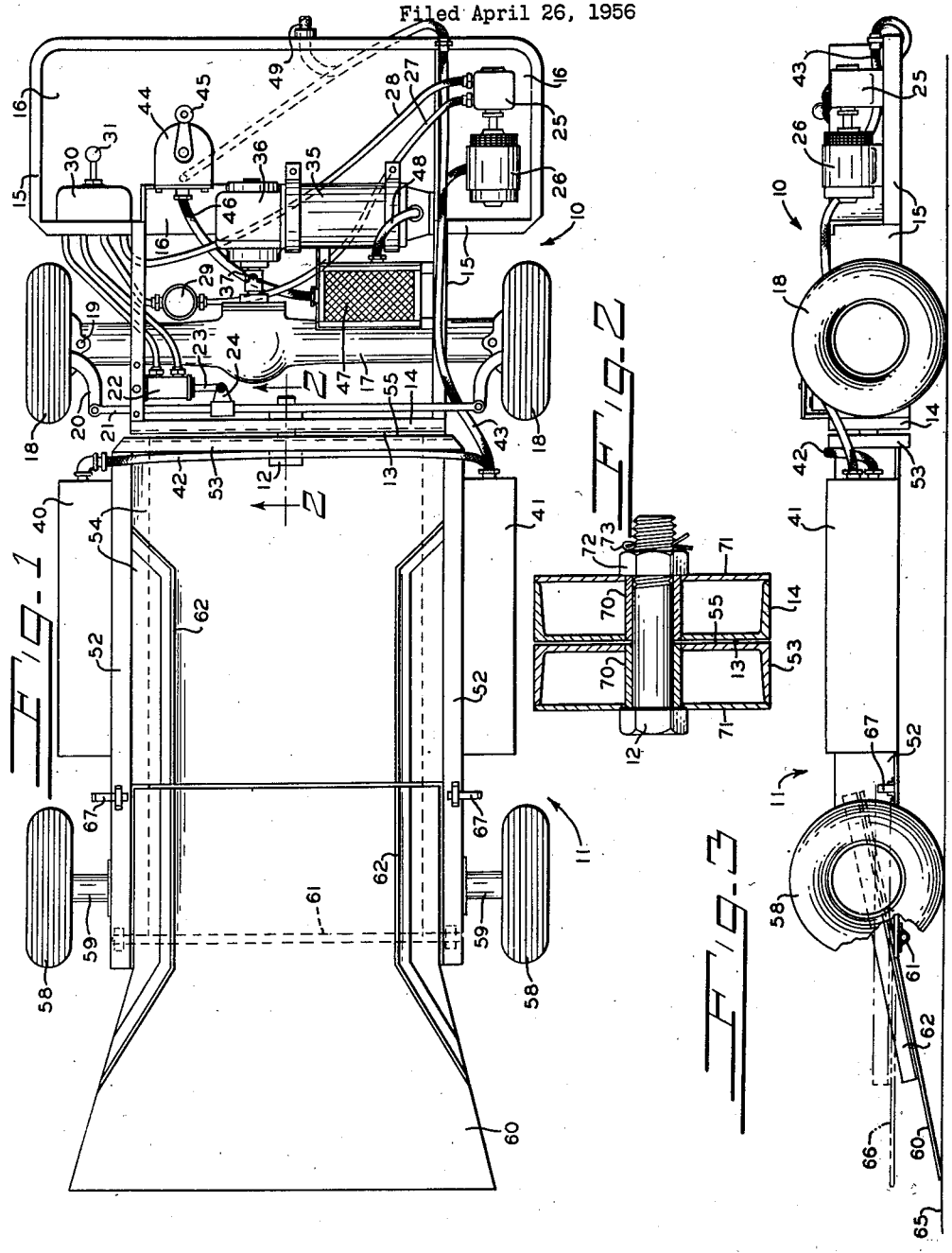
INVENTOR.
JAKE C. COOLEY
BY
DES JARDINS, ROBINSON & KEISER
*Howard F. Keiser*
HIS ATTORNEYS
United States Patent Office 2,818,187
Patented Dec. 31, 1957

2,818,187

MINE TRUCK

Jake C. Cooley, McDowell, Ky.

Application April 26, 1956, Serial No. 580,775

9 Claims. (Cl. 214—505)

This invention relates to a wheeled truck suitable for hauling heavy loads over uneven ground and, more particularly, to a truck comprised of a tractor section and a trailer section which sections are joined by a pivot connection so as to permit twisting or turning thereof relative to one another about a longitudinal axis when the wheels of the respective sections encounter irregularities in the road bed. By virtue of this feature, the design of the truck may be considerably simplified since the axles for the wheels may be attached directly to the framework of each section rather than being attached thereto through the usual spring suspension system.

Accordingly, it is an object of the present invention to provide a hauling truck of simplified construction which is adapted for hauling heavy loads over uneven ground.

Another object of the invention is to provide a truck comprised of a tractor section and a trailer section, the sections being pivotally connected so as to permit twisting or turning of the sections relative to one another about the longitudinal axis of the vehicle as it travels over irregular ground.

Another object of the invention is to provide the trailer section of the hauling truck with a pivoted loading ramp which tends to move down into loading position when the trailer is empty, and which is automatically elevated to traveling position when the equipment to be hauled by the truck is loaded on to the trailer section thereof.

With these and other objects in view, which will become apparent from the following description, the invention includes certain novel features of construction and combinations of parts, the essential elements of which are set forth in the appended claims and a preferred form or embodiment of which will hereinafter be described with reference to the drawings which accompany and form a part of this specification.

In the drawings:

Fig. 1 is a plan view of my new design of hauling truck.

Fig. 2 is a cross-sectional view taken along the line 2—2 in Fig. 1.

Fig. 3 is a side elevation of the truck shown in Fig. 1.

The truck which will hereinafter be described with reference to the accompanying drawings, is particularly adapted for hauling coal mining equipment from one location within the mine to another, or for hauling such equipment into and out of the mine. As hereinbefore indicated, the truck is comprised of a tractor section 10 and a trailer section 11 which constitute independent units, the only mechanical connection between the two being a pivot bolt 12 (see also Fig. 2) which is disposed with its axis extending longitudinally of the vehicle. By means of this construction, the tractor and trailer sections are permitted to twist or turn relative to one another about the axis of the pivot bolt 12.

The tractor section 10 includes a framework 15 which is of a box-like formation and which may be constructed of channels or other suitable structural forms welded together to provide a suitable framework structure which, in the present instance, has the T-shaped formation illustrated in Fig. 1. The framework 15 is provided with a floor or deck 16 upon which the operator may kneel or sit adjacent to the driving and steering controls of the truck. The framework of the tractor section is closed at the rear end of the tractor by a channel 14 (see also Fig. 2) the outer face 13 of which constitutes a "rub" face.

Secured to the framework 15 of the truck is a driving axle 17 on the ends of which are provided rubber tired wheels 18. The construction of the axle 17 is such as to permit both driving and steering of the wheels 18, the wheels being pivoted for movement about a substantially vertical axis by means of king pins 19 and being provided with steering arms 20 which are connected by a tie rod 21. Steering of the wheels 18 is effected hydraulically through a double-acting cylinder 22 having a piston rod 23 connected to the tie rod 21 by means of a bracket 24. Fluid under pressure for operating the cylinder 22 is furnished by a pump 25 driven by an electric motor 26. The hydraulic fluid is delivered by the pump 25 through lines 27 and 28 and bypass 29 to a hydraulic steering control valve 30 which is provided with a control lever 31 which may be manipulated by the operator of the truck to effect steering thereof through the cylinder 22.

Power for driving the axle 17 and wheels 18 is supplied by an electric motor 35 which drives a gear reducer 36 which in turn drives the axle 17 through a universal joint 37. Electric current for operating the motor 35 may be supplied either by a trailing cable 49 or from storage batteries. Boxes 40 and 41 mounted on the sides of trailer 11 are used to carry the batteries and/or overload protection items such as fuse and dis-connect switches. The electric cables from boxes 40 and 41 are led through conduits 42 and 43 to a controller 44 which is provided with an operating handle 45 for manipulation by the operator of the vehicle. The controller 44 is connected by a cable 46 with a resistance box 47 which in turn is connected by a cable 48 with the motor 35. By manipulation of the controller 45, the magnitude and direction of flow of the current from the trailing cable or batteries to the motor may be controlled as desired for proper operation of the vehicle. Electric current for driving the motor 26 is likewise obtained from the trailing cable or storage batteries carried by the vehicle.

The trailer section 11 has a framework including side channels 52, a front channel 53 and a floor plate 54. The outer face of the channel 53 constitutes a "rub" face 55 and is adapted to cooperate with the corresponding face 13 of the channel 14 which constitutes a portion of the framework of the tractor 10.

As best shown in Fig. 1, the trailer is provided with a pair of rubber tired wheels 58 journaled for rotation on stub axles 59 which are attached to the side channels 52 of the trailer section framework.

To assist in the loading and unloading of coal mining machines from the trailer 11, a loading ramp 60 is provided. This ramp consists of a heavy metal plate which is hinged on the trailer framework by means of an axle 61. Guide rails 62 may be provided on both the ramp 60 and the floor 54 of the trailer for guiding the coal mining machines hauled by the vehicle into the correct location on the trailer.

The weight of the ramp 60 is so distributed with respect to the axle 61 that the ramp will tend to drop into loading position as shown in Fig. 3 with the rear edge of the ramp engaging the ground 65. However, when a piece of coal mining machinery is loaded onto the trailer, the forward end of the ramp will be depressed thereby lifting the rear edge thereof off the ground as shown by the dot-dash lines 66 in Fig. 3. The trailer is also provided with a pair of traveling locks 67 which may be pushed inwardly from the positions shown in Fig. 1 to lie over the edge of the ramp 60 and hold it in elevated position to permit the vehicle to be moved about without any load in the trailer.

The swivel connection provided by the pivot bolt 12 between the tractor and trailer sections permits the sections to twist or turn relative to one another about a longitudinal axis as the vehicle travels over uneven ground. This feature permits the axles 17 and 59 to be rigidly affixed to the framework of the tractor and trailer sections, respectively, rather than necessitating their being supported by springs as in the conventional types of construction. The pivoting movement between the sections permits the wheels to follow the contour of the ground at all times without imposing any stresses on the framework of the vehicle.

The pivotal connection between the tractor and trailer sections is best shown in Fig. 2 where it will be seen that the channels 14 and 53 are each apertured to receive a bushing 70 through which the bolt 12 passes. The outer end of each bushing 70 is supported by a plate 71 secured to its respective channel 14 or 53 which is apertured to receive the bushing 70. The bushings 70 are, of course, preferably welded to their respective channels and plates so as to secure them rigidly in place.

As shown in Fig. 2, the bolt 12 is provided with a nut 72 screwed thereon, the nut being held in place on the bolt by means of a cotter pin 73. The nut 72 should be drawn up so as to leave only a small clearance between the "rub" faces 13 and 55, for example, ⅛ inch. The bolt, of course, must be of sufficient size and strength to resist the forces applied thereto in shear and tension by the tractor and trailer sections of the vehicle and for this purpose may be made from 2 to 3 inches in diameter. Any tendency of the vehicle to bend at the joint thus provided between the tractor and trailer sections is of course resisted by the "rub" faces 13 and 55 which are held in face-to-face relationship by the bolt 12. Hence, this bending force will be translated into a strain in tension on the bolt 12.

While I have described my invention in connection with one possible form or embodiment thereof and have used, therefore, certain specific terms and language herein, it is to be understood that the present disclosure is illustrative rather than restrictive and that changes and modifications may be resorted to without departing from the spirit of the invention or the scope of the claims which follow:

I claim:

1. A truck for hauling heavy loads over uneven ground comprising a wheeled tractor section and a wheeled trailer section, and means for connecting said sections together to permit pivotal movement therebetween about a longitudinal axis while preventing pivotal movement about a transverse axis whereby said sections are free to twist relative to one another as the truck travels over uneven surfaces but are prevented from bending under the influence of loads caried by said trailer section, said connecting means including cooperating rub plates which are parts of the tractor and trailer sections held in face-to-face relation for preventing the bending of said sections at the connection.

2. The truck of claim 1 wherein said rub plates are held together in face-to-face relation by a longitudinally disposed pivot bolt.

3. A truck for hauling heavy loads over uneven ground comprising a tractor section having a drive axle, a motor for driving said axle, and ground engaging traction wheels mounted on the ends of said axle, a trailer section having a plurality of ground engaging wheels journaled thereon for rotation about a common axis, and means for connecting said sections together to allow pivotal movement therebetween about a longitudinal axis while preventing pivotal movement about a transverse axis whereby said sections are free to twist relative to one another as the truck travels over uneven surfaces but are prevented from bending under the influence of loads carried by said trailer section, said connecting means including cooperating rub plates which are parts of the tractor and trailer sections held in face-to-face relation for preventing the bending of said sections at the connection.

4. The truck of claim 3 wherein said rub plates are held together in face-to-face relation by a longitudinally disposed pivot bolt.

5. A truck for hauling heavy loads over uneven ground comprising a tractor section having a framework, a drive axle attached to said framework, a motor for driving said axle, and ground engaging traction wheels mounted on the ends of said axle, a trailer section having a framework and a plurality of ground engaging wheels journaled thereon for rotation about a common axis, the framework of each section including a transverse rub plate, said plates being located on adjoining ends of said sections, means for holding said rub plates in face-to-face relation while permitting pivotal movement of the sections about an axis extending longitudinally of the truck, and a loading ramp supported for pivotal movement thereon about a transverse, horizontal axis disposed intermediate the front and rear ends of said ramp.

6. The truck of claim 5 wherein the rear end of said ramp is heavier than the front end thereof so as to cause the rear end to normally move into engagement with the ground.

7. The truck of claim 6 including manually operable traveling locks for holding the rear end of the ramp in an elevated position when the trailer is empty.

8. A truck for hauling heavy loads over uneven ground comprising a tractor section having a framework, a drive axle attached to said framework, a motor for driving said axle, and ground engaging traction wheels mounted on the ends of said axle, a trailer section having a framework and a plurality of ground engaging wheels journaled thereon for rotation about a common axis, the framework of each section including a transverse rub plate, said plates being located on adjoining ends of said sections, and means for holding said rub plates in face-to-face relation while permitting pivotal movement of the sections about an axis extending longitudinally of the truck.

9. The truck of claim 8 wherein said holding means includes a pivot bolt passing through axially aligned apertures provided in the rub plates.

References Cited in the file of this patent

UNITED STATES PATENTS

| | | |
|---|---|---|
| 706,534 | Dawson | Aug. 12, 1902 |
| 1,815,437 | Josephs | July 21, 1931 |
| 1,886,319 | Cohen | Nov. 1, 1932 |
| 2,366,166 | Willock | Jan. 2, 1945 |
| 2,613,827 | Van Doorne | Oct. 14, 1952 |
| 2,741,383 | Leckert | Apr. 10, 1956 |